United States Patent [19]

Caprio

[11] 3,871,023

[45] Mar. 11, 1975

[54] LIMITING DETECTOR CIRCUIT AND METHOD OF OPERATING SAME

[75] Inventor: Gerald L. Caprio, Des Plaines, Ill.

[73] Assignee: Motorola, Inc., Franklin Park, Ill.

[22] Filed: June 20, 1974

[21] Appl. No.: 481,297

Related U.S. Application Data

[63] Continuation of Ser. No. 248,195, April 27, 1972, abandoned.

[52] U.S. Cl. .............................................. 358/28
[51] Int. Cl. .......................................... H04n 9/535
[58] Field of Search .................. 358/28, 23; 329/50; 328/133

[56] References Cited

UNITED STATES PATENTS 3,647,941 3/1972 Anorade et al. ...................... 358/28

*Primary Examiner*—Richard Murray
*Attorney, Agent, or Firm*—Mueller, Aichele & Ptak

[57] ABSTRACT

An automatic hue control circuit for a color television receiver operates to improve the flesh tones reproduced by the receiver by causing signals lying near the +I axis to be shifted to the +I axis if they fall within a predetermined angle on either side of the +I axis. This is accomplished by splitting the chroma signal into its I and Q constituent parts and comparing the value of a predetermined fraction of the demodulated +I components with the absolute value of Q voltage components $|E_Q|$ to control the operation of a gating circuit to prevent or allow the passage of Q signal components to the conventional color demodulators in the receiver. To prevent operation of the automatic hue control circuit for highly saturated signals, the product detector or synchronous demodulator for demodulating the +I subcarrier signal components is supplied with reference or switching signals which have a maximum amplitude less than the maximum amplitude of the subcarrier signal components applied to it. This causes a limiting of the demodulated +I components established by the maximum amplitude of the switching signal thereby limiting the maximum value of the + I component which is compared with $|E_Q|$.

5 Claims, 5 Drawing Figures

PATENTED MAR 1 1 1975

3,871,023

LIMITING DETECTOR CIRCUIT AND METHOD OF OPERATING SAME

This is a continuation of application Ser. No. 248,195, filed April 27, 1972, now abandoned.

RELATED APPLICATION

The copending application to Gerald L. Caprio and Norman W. Parker, Ser. No. 248,195 filed on Apr. 27, 1972, now abandoned, discloses an automatic hue control circuit with which the circuit disclosed herein may be used.

BACKGROUND OF THE INVENTION

The NTSC color television signal presently in use includes a wide-band brightness or luminance (Y) signal and a modulated subcarrier signal or approximately 3.58mhz. The subcarrier signal is phase and amplitude modulated by color difference signals (R-Y, B-Y, and G-Y), so that phases of the subcarrier each represent the hue of an image portion and the subcarrier amplitude at that phase represents the saturation of that hue. A monochrome receiver visibly reproduces only the Y component.

The usual color receiver includes color demodulators for synchronously recovering the color difference signals which then can be added to the Y signal for developing the red, blue and green representative signals to be reproduced by the cathode ray tube. Other receivers include direct demodulators for directly developing the red, blue and green color representative signals, thereby avoiding the separate recovery and combination of the brightness signal with the demodulated color difference signals.

In either of these types of demodulators, however, it is necessary to provide a properly phased reference signal of the subcarrier frequency in order to produce output color representative signals at the proper hues. In the NTSC system, this is accomplished by including in the television signal bursts of a reference signal of the same frequency as the color subcarrier and having a particular phase relationship with the different phase of the subcarrier representing the different hues. These reference signal bursts are recovered at the receiver by a gating action and are applied to an automatic frequency control circuit associated with the local oscillator at the receiver. The recovered bursts and the output signal from the oscillator are compared to develop a control signal which is utilized to control the oscillator, so that its output signal is a continuous wave of the proper frequency and phase to be used as a demodulating signal for the color subcarriers. Since the burst theoretically occupies a position having a precise phase relationship with the modulated subcarrier signals, a local oscillator which is phase locked to this burst signal should provide an accurate reference signal for demodulating the correct hues of the transmitted signal.

In actual practice, however, it has been found that the transmitted burst does not always occupy the same phase relationship with the modulated color difference signals. This occurs due to the fact that the burst signal is not carried through the entire chain of signals at the transmitter but is reinserted into the signal prior to transmission thereof. If accurate control is not obtained over the precise phase of the reinserted burst, a deviation in the correct hue of the demodulated color difference signals occurs at the receiver. As a result, shifts in hue may occur during received programming when changes are made from camera to camera, station to station, from live telecasts to tape telecasts to film, or from network transmission to local transmission. Any time an improper phase relationship exists between the burst signal and the remainder of the transmitted signal for any reason, a shift in the hue of the reproduced colors at the television receiver occurs. For most objects, such a shift in hue or color is not detectable by the viewer since there is no reference based on previous information with which the viewer may make an exact comparison. If, however, the scene being reproduced includes flesh tones, immediately a viewer detects errors in the color reproduction since there is a preestablished reference for such flesh tones in the mind of the viewer. As a consequence, it is necessary to readjust the hue control establishing the phase of the local oscillator in order to reproduce the flesh tones accurately. If another shift in the phase relationship of the burst signal occurs, it again is necessary to readjust the hue control in order to cause the reproduced picture to be satisfying to the viewer. Thus, it is desirable to provide a television receiver in which changes in the phase relationship of the burst signal can be automatically compensated at the receiver.

The systems disclosed in the above-identified Caprio/Parker application operate to alter the relative phases of the reference or local oscillator signal and the subcarrier signal to shift the phases in such a manner to expand the region about the +I axis which is reproduced as a flesh tone color. The systems of the Caprio/Parker application also minimize any undesirable affects of the automatic hue control circuit on colors which do not lie within a pre-established angle on either side of the +I axis.

Further it has been determined that flesh tones which are most susceptible to noticeable variations in hue by a viewer of a color television receiver are generally low saturation colors. As a result, it is desirable to alter hues in an automatic hue control circuit only for low saturation colors lying within the predetermined angle on either side of the I axis while disabling the automatic hue control circuit operation for high saturation colors, since such high saturation colors most likely are not flesh or facial tones.

SUMMARY OF THE INVENTION

Accordingly it is an object of this invention to provide a limiting product detector.

It is an additional object of this invention to provide a limiting product detector for use in an automatic hue control system for a color television receiver.

It is a further object of this invention to provide a method of operation of a product detector as a limiting detector.

It is yet another object of this invention to limit the magnitude of reference switching signal components applied to a product detector to a value less than the maximum amplitude of the modulated signal components applied to the detector.

In accordance with a preferred embodiment of this invention, a synchronous or product detector is operated by applying switching signals to it having an amplitude which is limited to a value less than the maximum amplitude of the amplitude modulated information signals applied to the detector. This is accomplished by limiting the amplitude of the switching or reference signals supplied to the switching input of the demodulator to a value which is less than the maximum amplitude of the modulated signal inputs applied to the demodulator.

DETAILED DESCRIPTION

Figure 1:
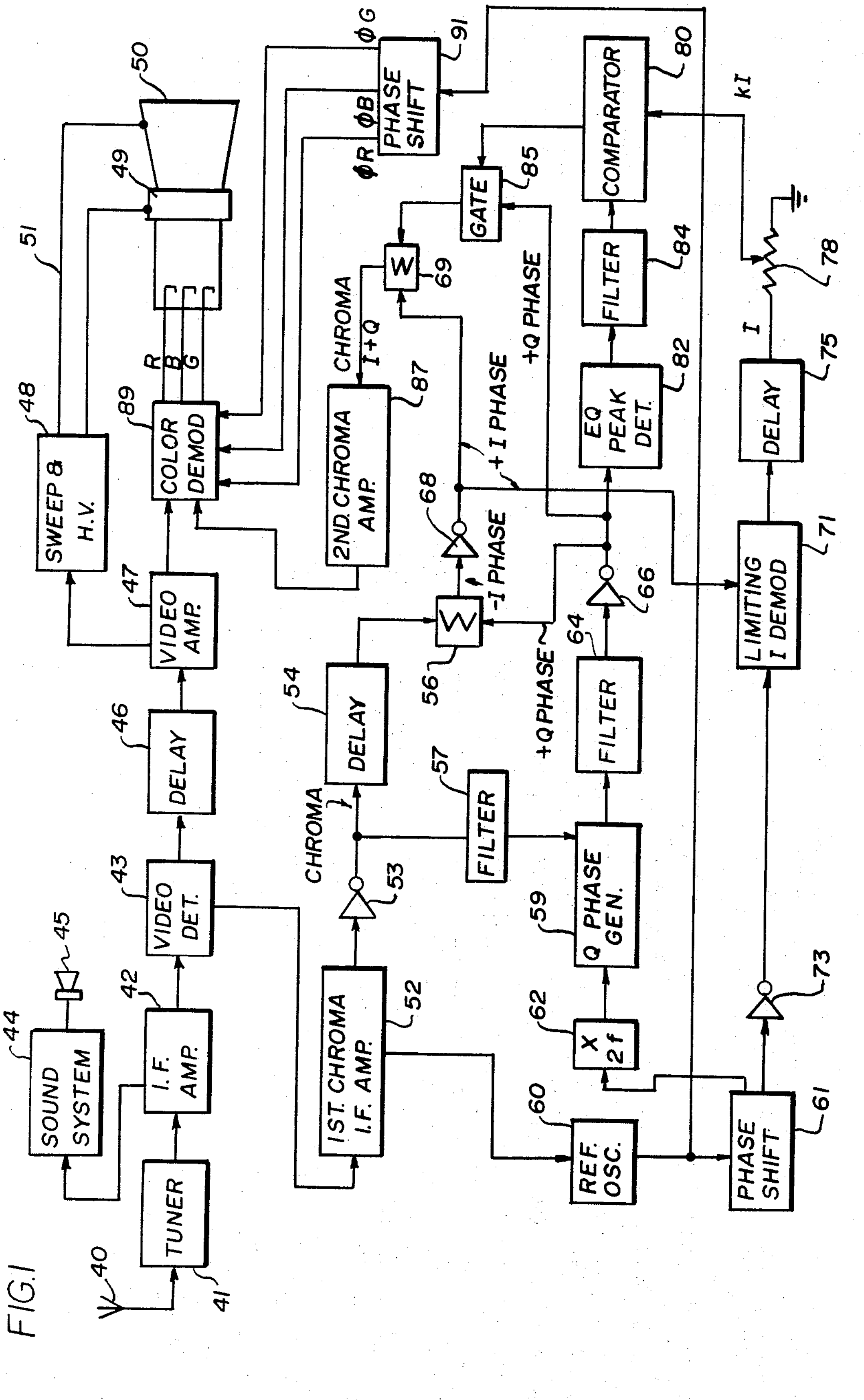
FIG. 1 is a block diagram of an automatic hue control circuit in which a limiting demodulator operated in accordance with the preferred embodiment of this invention may be used.

Referring now to FIG. 1, there is shown a block diagram of a color television receiver employing direct color demodulation which has been modified to incorporate an automatic hue control circuit including a limiting demodulator operated in accordance with an embodiment of this invention. Input television signals (which are the standard NTSC color television signals) having brightness signal components; a subcarrier signal component modulated by the R-Y, B-Y and G-Y color difference signals representing hue and saturation at different phases of the subcarrier; burst signal components; and synchronizing signal components; along with sound signal components are received on an antenna 40 and applied to a tuner circuit 41 which includes the conventional tuner, RF amplifier and converter for producing intermediate frequency signals.

These intermediate frequency signals are supplied to an intermediate frequency (IF) amplifier 42 from which the sound signals are applied to a sound system 44 and reproduced on a loudspeaker 45. The output of the IF amplifier 42 also is supplied to a video detector 43. The detector 43 in turn is coupled to a video amplifier 47 through a delay circuit 46, which is used in the circuit to compensate for delays occurring in the chrominance signal path as is well known. Signals also are supplied by the video amplifier 47 to a sweep and high voltage circuit 48 which has outputs connected to a deflection yoke 49 on a cathode ray tube 50. In addition, the sweep and high voltage system 48 provides a high voltage for the screen of the shadow mask of the cathode ray tube 50 over a lead 51 in a conventional manner.

The video detector 43 also supplies signals to a first chroma IF amplifier stage 52 which is used to process the modulated chroma signal components of the received composite signal. in the chroma IF amplifier stage 52, there is a band-pass filter network for selecting the color subcarrier at 3.58 meghertz and its associated sidebands, and these signals are applied through an inverter 53 and a delay circuit 54 to one of two inputs of an adder circuit 56. The minus chroma signal components obtained from the output of the inverter 53 also are applied through a filter 57 to one input of a Q phase generator circuit 59.

To generate a Q subcarrier signal component in the circuit 59, an output of the first chroma IF amplifier (taken from an earlier stage of the amplifier) is coupled to a color synchronizing oscillator 60 which selects the burst signals appearing on the "back porch" of the horizontal synchronizing pulses to develop a color reference signal of 3.58 megahertz in synchronism with the burst signal. This color reference signal is supplied through a phase shift circuit 61, which in turn supplies a 3.58 megahertz reference signal at the Q phase to a frequency doubler 62, the output of which also is applied to the Q phase generator 59. The Q phase generator 59 then mixes the 7.16 megahertz reference signal from the doubler 62 with the 3.58 megahertz modulated minus chroma signal and produces a 3.58 megahertz output signal modulated by signal components at the Q phase. The operation of this circuit is described in more detail subsequently in the description of FIGS. 4 and 5. To eliminate any residual 7.16 megahertz reference signals from the output of the Q phase generator, the output is passed through a filter 64 which removes these components. The output of the filter 64 also is inverted by an inverter 66 to provide a +Q phase signal which is applied to the other input of the adder circuit 56.

By adding the +Q phase 3.58 megahertz signal and the minus chroma modulated subcarrier signal in the adder circuit 56, the Q phase signals are exactly out of phase and cancel so that the output of the adder circuit 56 is a −I phase modulated signal at the 3.58 subcarrier frequency. This signal is inverted to a +I phase modulated signal by an inverter 68 and is applied as one input to an adder circuit 69 and as an input to a limiting I demodulator 71.

Figure 2:
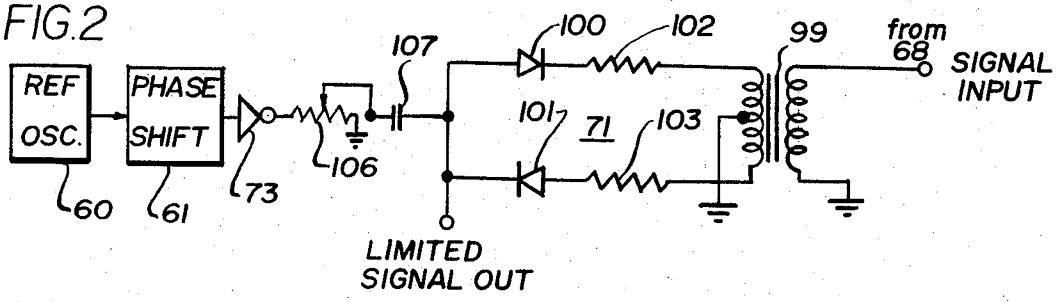
FIG. 2 is a schematic diagram of a limiting demodulator in accordance with a preferred embodiment of the invention.

To demodulate the +I phase signal for utilization in the control circuit shown in FIG. 2, a second output of the phase shift circuit 61 at −I phase is supplied through an inverter 73 which applies a +I phase reference signal at 3.58 megahertz to the limiting I demodulator 71. This causes the demodulator 71 to produce at its output a limited I base-band or demodulated signal. The magnitude of the reference signal applied to the limiting demodulator 71 from the inverter 73 is selected to be less than the maximum magnitudes of the +I phase signals applied thereto. As a consequence, the output of the demodulator 71 is a limited I demodulated to baseband output in which the maximum amplitude of the demodulated I signals is clamped to a value determined by the value of the 3.58 reference signal applied to the demodulator 71. This serves the purpose of inhibiting the operation of the hue control circuit for highly saturated signals which lie within the wedge or angle of control of the circuit. This operation will be explained more fully subsequently.

The limited I signals then are supplied through a delay circuit 75, used to supply a necessary delay to maintain the time relationship of the various signals in the hus control circuit in synchronism with one another, to one end of a potentiometer 78. The potentiometer 78 is utilized to supply a desired fraction ($k$I) of the voltage of the demodulated I signal component from the tap to one of two inputs of a comparator circuit 80.

The comparator circuit 80 is supplied on its other input with a control signal corresponding to the absolute value of the demodulated Q components ($|E_Q|$), for comparison with the voltage $k$I. To obtain the control signal $|E_Q|$, the output of the inverter 66 is applied to a peak detector circuit 82 which produces the signal $|E_Q|$. This signal is supplied through a filter 84, to remove any residual 3.58 megahertz components, to the comparator 80.

Whenever the control signal $|E_Q|$ is greater than (more positive than) the value of the control signal $k$I applied to the other input of the comparator 80 from the potentiometer 78, the comparator circuit 80 supplies an enabling signal to a gate 85 to permit the +Q phase signals obtained from the inverter 66 to be passed by the gate 85. When the reverse relationship of the two control signals applied to the inputs of the comparator 80 exists, the gaate 85 blocks the passage of Q phase signals through it.

The output of the gate 85 is combined with the +I phase signals in the adder circuit 69 which supplies a modified chroma signal with the +I and +Q components to a second chroma amplifier stage 87. So long as $|E_Q|$ is greater than the value of $k$I, the signal applied to the input of the second chroma amplifier 87 is the same as the signal obtained from the output of the first chroma IF amplifier 52. Whenever the value of the $k$I control signal is greater than $|E_Q|$, only I phase chroma components are applied to the input of the second chroma amplifier circuit 87 since no enabling signal is obtained from the output of the comparator 80 for this condition. This causes the gate 85 to block the passage of the +Q phase components.

The output of the chroma amplifier 87 is connected to the color demodulator circuit 89 which also is supplied with the video or brightness signal components from the video amplifier 45. The color demodulator circuit 89 is illustrated as a direct demodulator supplied with 3.58 megahertz reference signals at the proper phases from a phase shift circuit 91 to produce demodulated red, blue and green color signals for driving the cathode of the cathode ray tube 49.

Figure 3:
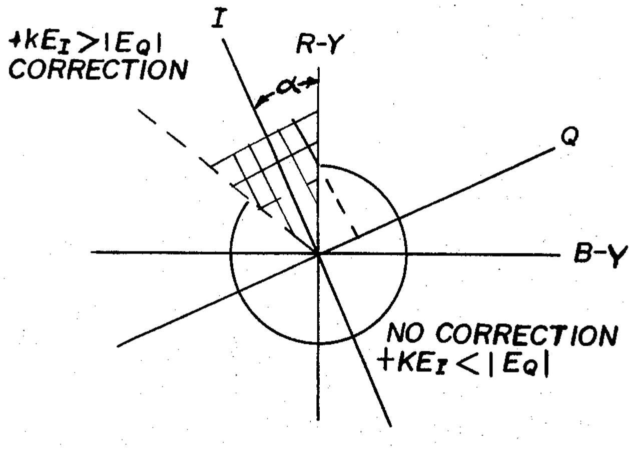
FIGS. 3, 4 and 5 illustrate various phase relationships of signals useful in explaining the operation of the circuits shown in FIGS. 1 and 2.
Figure 4:
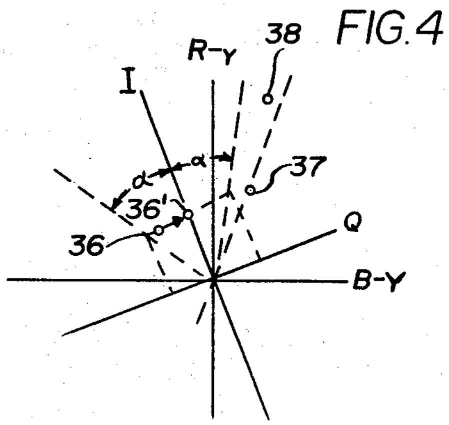

The operation of the circuit of FIG. 1 may be more readily understood by reference to FIGS. 3 and 4. Both of these figures show vector diagrams of the relative phases for the I and Q and R-Y and B-Y axis of the NTSC color television subcarrier signal. In interpreting a plot of a point or dot representative of a particular color on either of the vector diagrams of FIGS. 3 and 4, the phase angle of the vector from the origin or center point of the diagram to the dot or color location provides an indication of the hue. The length of the vector is indicative of color saturation or intensity when considered along with the corresponding luminance level. Thus, any color can be represented by a vector at a particular phase in the diagram while the saturation of that color is represented by the length of the vector. It also is apparent that each vector has components which project on the I and Q axes, so that all of the vectors can be defined in terms of their projections on these two axes.

The meaning of this in terms of the operation of the circuit shown in FIG. 1 is that when the projection of a vector on either the plus or minus Q axis ( $|E_Q|$ ) is greater than the value of $+kE_I$, no correction occurs. This is indicated in FIG. 3 by the greater part of the circle which is so labeled. When the value of $+kE_I$, however, is greater than $|E_Q|$, the correction takes place by blocking the gate 85. Then only I and Y signal components are applied to the color demodulator 89 to be converted into the R, B and G color signals. The area in which this occurs is indicated in FIG. 3 by the shaded portion, with the half angle alpha ($\alpha$) being determined by the ratio of $+kE_I$ to $|E_Q|$.

Thus, any signal lying within the half angle alpha on either side of the +I axis will have the Q component removed by the circuit of FIG. 1 prior to being applied to the color demodulator 89. This causes such signals to be collapsed to the I axis to provide the desired correction of flesh tones, which as stated previously, predominantly lie along with I axis. The half angle alpha can be varied with the circuit of FIG. 1 from 45° on each side of the +I axis to 0 by adjustment of the tap of the potentiometer 78. Thus, it is possible to select the area in which the hue correction is desired to take place while no correction takes place outside of the half angle alpha on either side of the +I axis.

Referring now to FIG. 4 there is shown a color vector diagram for a color television receiver of the type shown in FIG. 1 in which the ratio of $+kE_I$ to $|E_Q|$ provides the half angle alpha on each side of the +I axis to determine the area in which signals will be moved toward the +I axis by the circuit of FIG. 1. From an examination of FIG. 4, it can be seen that the color spot 36 falling just to the left of the +I axis is in this region covered by the half angle alpha. The circuit of FIG. 1 operates to move colors at the spot 36 to the +I axis. This is shown in FIG. 4 by the spot 36' which results from the collapse of Q component blocked by the gate 85 for colors falling within the half angle alpha on each side of the +I axis With the constant $k$ selected by adjustment of the tap on the potentiometer 78 to provide the half angle alpha shown in FIG. 4, the color spots 37 and 38 are unefected by the operation of the circuit since the absolute value of the Q component $|E_Q|$ for these two color spots is greater than the value $+kE_I$. Any color spot lying within the wedge formed by the half angle alpha is moved all the way to the +I axis by the circuit of FIG. 1. If movement all the way to the +I axis is not desired, it is apparent that the gate 29 instead of blocking all of the Q components could permit a certain fraction or percentage of the Q components to pass, this fraction of course being less than the value of the Q components.

As stated previously, the demodulator 71 is a limiting demodulator. The manner in which the limiting action is effected is illustrated in FIG. 2 in which the demodulator 71 is shown as balanced diode demodulator. The +I phase signal input to the demodulator 71 from the inverter 68 is applied to the primary winding of the transformer 99 as shown in FIG. 2. The secondary winding of this transformer has the opposite ends thereof connected through resistors 102 and 103 to the cathode and anode, respectively, of a pair of diodes 100 and 101. Demodulated I output signals from the demodulator 71 are obtained from a common junction of the anode of the diode 100 and the cathode of the diode 101. This is the output which is connected to the delay circuit 75 of FIG. 1.

The 3.58 megahertz reference signals from the output of the reference oscillator 60 are shifted to the +I phase by the phase shift circuit 61 and the inverter 73 and are applied through a variable resistor 106 and an AC coupling capacitor 107 to the output junction of the diodes 100 and 101. The variable resistor 106 is adjusted to limit the maximum amplitude of the 3.58 megahertz reference signal which is applied to the balanced demodulator circuit 71 to a value which is below the peak value of the +I phase signal components applied to the demodulator 71 through the transformer 99. The amount by which the reference signal is selected to be less than the peak value of the +I phase signal is adjusted by varying the position of the tap on the resistor 106. This limitation of the maximum amplitude of the reference or switching signal applied to the demodulator 71 is opposite to the manner in which balanced demodulators normally are operated. Normally, the switching signal supplied to the demodulator has a maximum amplitude greater than the maximum amplitude which can be attained by the signals to be demodulated in order to provide a full demodulation of all of the input signal components at the output of the demodulator. This is not desired for the operation of the demodulator shown in FIG. 2 and used in the circuit of FIG. 1.

By limiting the value of the reference or switching signal applied to the demodulator 71 to a lower maximum amplitude than the maximum amplitude of the input signal, the output of the demodulator is an amplitude limited signal, the maximum value of which is determined by the maximum amplitude of the switching or reference signal applied to the demodulator. This then causes the demodulator 71 to perform two functions, demodulation and limiting. As a result, there is no necessity for a separate limiter circuit connected in series with the demodulator.

So long as the input signal applied by the transformer 99 to the demodulator 71 has an amplitude which is less than the amplitude of the reference signal applied to the demodulator, conventional operation of the demodulator takes place, and the signal output is representative of the full amplitude of the input signals applied to the primary winding of the transformer 99. Whenever the input signal to be demodulated, however, has an amplitude which exceeds the amplitude of the reference switching signal, the demodulated output signal is limited by the amplitude of the reference signal; so that input signals applied to the transformer 99 having an amplitude in excess of this limiting amount do not further increase the amplitude of the output of the demodulator beyond the limiting amount. The particular point at which this limiting takes place, as stated previously, may be adjusted by adjusting the tap of the variable resistor 106.

The utilization of the demodulator 71 as a limiting demodulator is for the purpose of preventing shifting in phase of hig saturation signals which otherwise lie within the wedge or angle of signals affected by the hue control circuit of FIG. 1. The manner in which this is accomplished is illustrated in the vector diagram of FIG. 5 in which the half angle alpha is illustrated as being sufficient to cause the color spots 36 and 37 to be moved to the +I axis as shown by 36' and 37' in FIG. 5.

Figure 5:
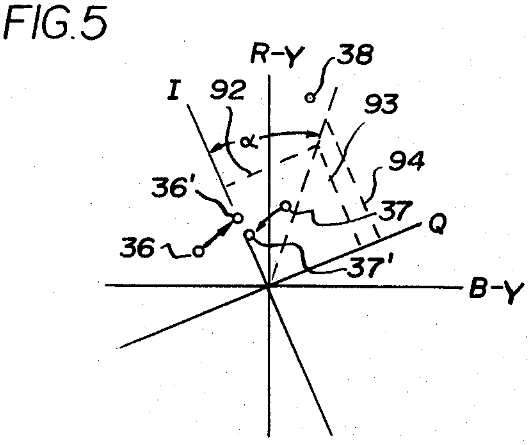

It also is noted that the color spot 38, representative of a highly saturated color falling just to the right of the R-Y axis, also is within the wedge of the half angle alpha in FIG. 5. Without the limiting operation of the demodulator 71, the color spot 38 also would be moved to the +I axis. Flesh tones of the type which the circuit of FIG. 1 is designed to correct normally are low saturation colors, so that a color falling at the high intensity of high saturation point of the spot 38 most likely is not a flesh tone. Therefore it should be reproduced without modification. This is accomplished by the action of the limiting demodulator 71.

The dotted line 92 in FIG. 5 represents the maximum or limited value of $+kI$ which can be obtained from the output of the limiting I demodulator 71. The corresponding dotted line 93 projecting on the Q axis indicates the maximum value of $E_Q$ which can occur for color spots lying within the correction wedge before the comparator 80 enables the gate 85. If the maximum value of $+kI$ is held to the value 92 shown in FIG. 5, a color spot 38 which has a projection on the Q axis indicated by the dotted line 94 causes $E_Q$ obtained by such a projection to exceed the limited value $+kI$ shown by the line 92. As a consequence, the gate 85 is enabled, passing the Q signal components to the adder 69 and no color correction takes place for the highly saturated colors such as color 38 shown in FIG. 10.

By the use of the limiting I demodulator 71 in conjunction with the potentiometer 78, the range or area over which the hue control circuit is rendered effective may be varied considerably. As stated previously, since flesh tones normally are low saturation colors, it is desirable to limit the output $+kI$ as much as possible to permit the faithful reproduction of highly sturated colors while still providing the desirable result of correcting for flesh tone errors in the reproduced picture.

Although the demodulator circuit 71 which is illustrated in FIG. 2 is shown as a simple balanced diode detector, other forms of balanced synchronous demodulators could be employed to achieve the same results. The demodulator shown in FIG. 2 was selected merely for purposes of illustration and is not to be considered as limiting the particular form that the demodulator can take.

I claim:

1. A product detector having first and second inputs including in combination:

means for supplying an amplitude modulated input signal at a predetermined frequency to the first input of said product detector, the amplitude modulations of said input signal being subject to exceeding a predetermined amplitude; and means for supplying a reference signal at said predetermined frequency, and having an amplitude less than said predetermined amlitude, to the second input of said product detector.

2. A color television receiver which receives a composite signal comprising at least a subcarrier signal component modulated in phase and amplitude to represent hue and saturation of a color image and a burst component for phase locking the signal of an oscillator of the receiver, the maximum amplitude attainable by said subcarrier signal component being a first predetermined amplitude, said receiver including in combination:

a reference oscillator supplied with at least said burst component for producing a reference switching signal at the frequency of said subcarrier signal and at a predetermined phase relative to the phase of said burst component;

a synchronous product detector having a reference signal input and an information signal input;

signal amlitude limiting means coupled between the output of said reference oscillator and the reference signal input of said product detector for applying reference switching signals to said product detector at a second predetermined amplitude less than said first predetermined amplitude; and means for applying said modulated subcarrier signal component to the information signal input of said product detector.

3. The combination according to claim 2 wherein said product detector is a balanced demodulator.

4. The combination according to claim 2 wherein said amplitude limiting means comprises a variable resistance means.

5. A method of operating a synchronous product detector having an information signal input and a switching signal input including the steps of:

supplying an amplitude modulated input signal at a predetermined frequency and having a first predetrmined maximum amplitude to the information signal input of said synchronous product detector; and supplying a switching signal at said predetermined frequency and having a second predetermined maximum amplitude less than said first predetermined maximum amplitude to the switching signal input of said product detector.

* * * * *